United States Patent [19]

Corbacella

[11] 4,144,214

[45] Mar. 13, 1979

[54] EXTENSIBLE FILMS FOR PACKAGING FOODSTUFFS

[75] Inventor: Carlo Corbacella, Ferrara, Italy

[73] Assignee: Montedison S.p.A., Milan, Italy

[21] Appl. No.: 843,327

[22] Filed: Oct. 18, 1977

[30] Foreign Application Priority Data

Oct. 19, 1976 [IT] Italy ................................. 28484 A/76

[51] Int. Cl.$^2$ .......................... C08K 5/01; C08L 23/06; C08L 23/16
[52] U.S. Cl. ............................ 260/23 H; 260/33.6 PQ; 260/897 A
[58] Field of Search .................. 260/23 H, 33.6, 897 A

[56] References Cited

U.S. PATENT DOCUMENTS

| Re. 26,850 | 4/1970 | Palmer | 260/33.6 PQ |
|---|---|---|---|
| 3,287,309 | 11/1966 | Basdekis et al. | 260/33.6 PQ |
| 3,929,938 | 12/1975 | White et al. | 260/28.5 AV |
| 4,056,499 | 11/1977 | Taylor | 260/23 H |
| 4,066,576 | 1/1978 | Bork et al. | 260/23 H |

*Primary Examiner*—Ronald W. Griffin

[57] ABSTRACT

Extensible, transparent, and self-adhering films, particularly suitable for packaging food, are disclosed. The films, which are also useful for sealing open containers, have a thickness of from 10 to 40 microns and consist of a mixture comprising low-density polyethylene, amorphous ethylene/propylene copolymers, at least one monoglyceride of a fatty acid containing from 12 to 25 carbon atoms in the chain, and vaseline oil.

4 Claims, No Drawings

EXTENSIBLE FILMS FOR PACKAGING FOODSTUFFS

THE PRIOR ART

Polyvinylchloride films which are extensible, transparent and self-adhering are available on the market.

However, due to the suspicions recently aroused regarding the toxicity of vinylchloride polymers, as well as for reasons of economy, producers and users of such films have been compelled to turn their attention to other types of polymers that can be formed into films which have the properties necessary for satisfying the requirements for a film useful in the temporary packaging of foods, sealing open containers, etc.

The requisites are, in general, non-toxicity, a high degree of stickiness, and a high degree of elastic recovery, transparency and mechanical resistance, but can vary in importance depending on where the films are to be used.

Elastic recovery is of particular importance in films intended for packaging foodstuffs in supermarkets, while the degree of stickiness of the films is considered of secondary importance because the packages are sealed by means of a light welding on a hot plate.

For films intended for home use, however, stickiness is considered of primary importance, while the elastic recovery is of less concern.

Films of polyolefins, mainly of homo- and co-polymers of ethylene, have been substituted for the polyvinylchloride films with, however, rather unsatisfactory results.

THE PRESENT INVENTION

One object of this invention is to provide extensible films particularly suitable for packaging foodstuffs and which are non-toxic and less costly than the polyvinylchloride films and more satisfactory than films made of the ethylene homopolymers or copolymers.

This and other objects are accomplished by the invention which provides films having a thickness of from 10 to 40 microns and which consist of a mixture comprising:

(a) 70 to 95 parts by weight (p.w.) of low-density polyethylene;
(b) 30 to 5 p.w. of amorphous ethylene/propylene copolymer having a Mooney viscosity of from 20 to 60, at 100° C.;
(c) 0.1-1.0 p.w. [on 100 p.w. of (a) + (b)] of at least one monoglyceride of a fatty acid containing, with regard to the fatty acid, from 12 to 25 carbon atoms in the chain; and
(d) 0.1 to 0.5 p.w. [on 100 p.w. of (a) + (b)] of vaseline oil.

The low-density polyethylene used for the films of this invention preferably has a Melt Index value comprised between 2 and 6, and densities comprised between 0.918 and 0.925, preferably between 0.920 and 0.923.

The ethylene/propylene copolymers used for the purpose preferably contain from 70 to 50% in moles of ethylene units and from 30 to 50% in moles of propylene units, and even more preferably are characterized by containing ethylene and propylene units in a molar ratio of 50:50.

Said copolymers are contained in the films of this invention preferably in quantities comprised between 5% and 20% by weight against quantities of polyethylene [component (a)] comprised between 80% and 95% by weight on the total weight of the mixture of the copolymers with the polyethylene.

The amorphous ethylene-propylene copolymers are known products and can be prepared, for instance, by the method described in French Pat. No. 1,162,882.

Examples of monoglycerides that can be used in the new films are: glyceryl monostearate, glycerylmonopalmitate, glycerylmonolaurate, glycerylmonooleate, glycerylmonoerucate and glycerylmono ricinoleate.

By "monoglycerides" we mean not only the monoglycerides per se but also mixtures of mono-, di- and/or triglycerides containing at least 35% by weight of such monoglycerides.

By "vaseline oil" is meant normally, and herein, a mixture of predominantly saturated paraffin hydrocarbons having in the chain a number of carbon atoms below 25.

The films according to this invention can be obtained by preparing a homogeneous mix of the four components in the above-specified ratios, by means of a conventional mixer, e.g., a Banbury mixer, at temperature that may vary, depending on the type of polyethylene used, but that in general is comprised between 180° and 240° C., and then transforming the mixture into a film by extrusion either in a flat or tubular extruder, following conventional technologies comprising a final cooling step of the film either in air or in water.

Also, components (b), (c) and (d) in high concentrations (normally about ten times higher than that desired in the end product) can be dispersed in a polyethylene base (a), and the concentrated dispersion added to further quantities of polyethylene, until the desired concentration ratios are reached, during the above-mentioned extrusion step by simple mechanical mixing.

The film thus obtained, if desired, may be subjected to either a mono- or biaxial orientation, following the conventional procedures and with conventional stretch ratios.

The following examples are given to illustrate the invention in greater detail and are not intended to be limiting.

EXAMPLE 1

Operating at 200° C. in a Banbury mixer, there was prepared a homogeneous mixture containing the following components:

|  | Parts By Weight |
|---|---|
| Polyethylene (density = 0.921; M.I. = 3.5) | 92.7 |
| Amorphous ethylene/propylene copolymer (50% in moles of $C_2$) having a Mooney Viscosity at 100° C. = 40 | 7.3 |
| Vinlub 10 (a mixture of mono, di- and triglyceryl stearate of the Firm COMMER, containing 40% b.w. of monoglycerylstearate) | 0.3 |
| Vaseline oil | 0.2 |

The mixture thus obtained was shaped into a film by means of an extruder provided with a water-cooled cooling system, at a temperature of 180° C., and using a blow-ratio of 2.5:1.

The characteristics of the film thus obtained have been recorded in the Table, infra.

EXAMPLE 2

Following the same procedures as in Example 1, there was prepared a mixture containing the following components:

|  | Parts By Weight |
|---|---|
| Polyethylene (density = 0.921; M.I. = 3.5) | 89 |
| Amorphous ethylene/propylene copolymer (containing 50% in mols of $C_2$) with a Mooney viscosity at 100° C. = 40 | 11 |
| Monostearina (a mixture of mono, di, and triglyceryl stearate of the DAC Firm, containing about 50% b.w. of monoglyceryl-stearate) | 0.20 |
| Vaseline oil | 0.2 |

This mix was then extruded through a tubular extruder with air cooling, at a temperature of 190° C. The film was blown at a blow-ratio of 3:1.

The characteristics of the film are recorded in the Table.

TABLE

|  | ASTM Standards | Measurement Unit | Example 1 | Example 2 |
|---|---|---|---|---|
| Thickness | D 645-67 | $\mu$ | 20. | 20. |
| Haze | D 1003-61 | % | 1.3 | 4.5 |
| Gloss 45° | D 2457-65 T | % | 85. | 72.7 |
| Longitudinal breaking load | D 882-64 T | $Kg/cm^2$ | 200. | 180. |
| Transversal breaking load | D 882-64 T | $Kg/cm^2$ | 92. | 105. |
| Longitudinal elongation at break | D 882-64 T | % | 210. | 230. |
| Transversal elongation at break | D 882-64 T | % | 455. | 470. |
| Elastic recovery 20% | D 412-68 | % | 18. | 16. |
| Tack* | — | $Kg/cm^2$ | 0.450 | 0.385 |

*The tack values were determined according to Montedison Standards MA 17118, using a TEL-TACK apparatus, built by Monsanto Rubber Testing Equipment, and on a type B ASTM D 412-68 hollow punch.

What is claimed is:

1. Extensible films for packaging, having a thickness comprised between 10 and 40 microns and consisting of a mixture comprising the following components:
   (a) from 70 to 95 parts by weight of a polyethylene having a density of 0.918 to 0.925;
   (b) from 30 to 5 parts by weight of an amorphous ethylene/propylene copolymer, having a Mooney viscosity at 100° C. comprised between 20 and 60;
   (c) from 0.1 to 1 part by weight, on 100 parts by weight of (a) + (b), of at least one monoglyceride of fatty acid containing, with reference to the fatty acid, from 12 to 25 carbon atoms in the chain; and
   (d) from 0.1 to 0.5 parts by weight, on 100 parts by weight of (a) + (b), of paraffin oil.

2. Film according to claim 1, containing between 80 and 95 parts by weight of component (a) and between 5 and 20 parts by weight of component (b).

3. Film according to claim 1, characterized in that the polyethylene has a Melt Index value of from 2 to 6.

4. Film according to claim 1, characterized in that the ethylene-propylene copolymer contains between 70 and 50% in moles of polymerized ethylene units.

* * * * *